Nov. 1, 1966 — E. R. HINDEN — 3,282,094
INSTRUMENT AND METHOD FOR TESTING COATINGS
Filed March 26, 1964
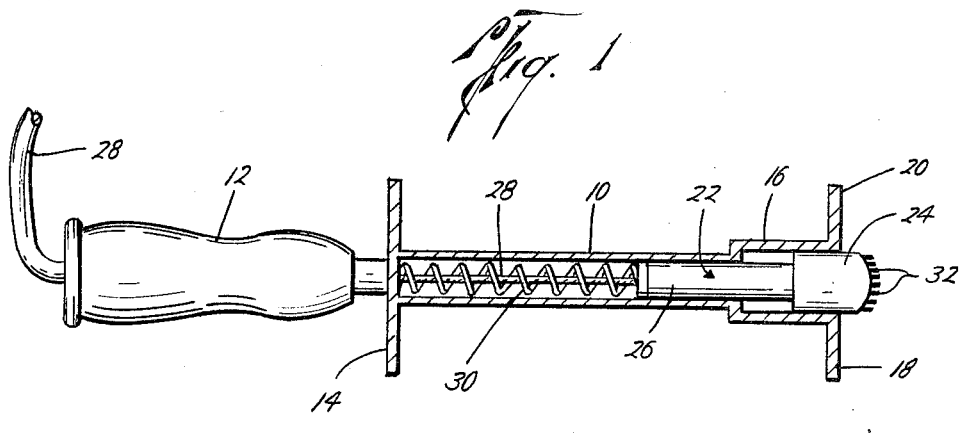
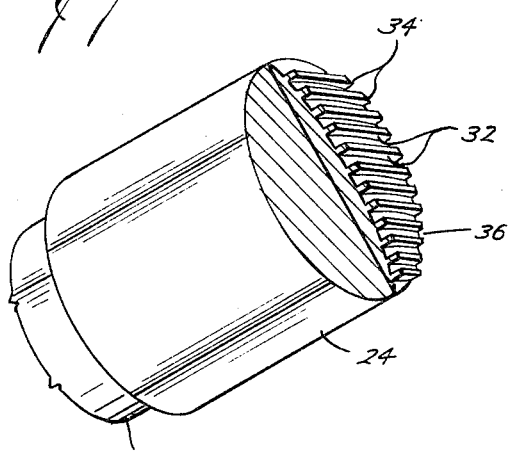
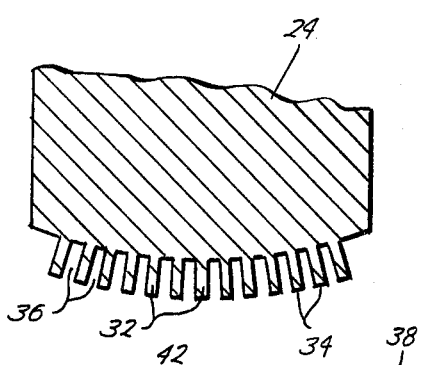
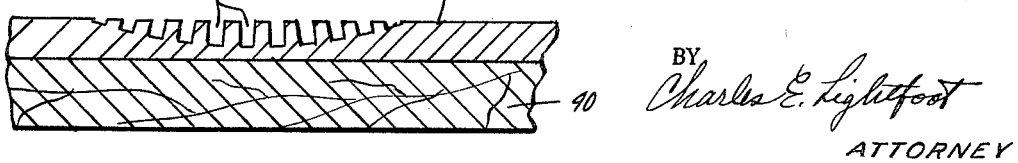
Edwin R. Hinden
INVENTOR.
BY Charles E. Lightfoot
ATTORNEY

United States Patent Office 3,282,094
Patented Nov. 1, 1966

3,282,094
INSTRUMENT AND METHOD FOR TESTING COATINGS
Edwin R. Hinden, Houston, Tex., assignor to Houston Society for Paint Technology, % Federation of Societies for Paint Technology, Philadelphia, Pa., an association of Houston, Tex.
Filed Mar. 26, 1964, Ser. No. 354,877
9 Claims. (Cl. 73—150)

This invention relates to the testing of coatings and more particularly to an instrument by which characteristics such as the degree of curing or hardening of a coating or the like may be determined.

The invention is capable of use in the testing of a wide variety of coatings or synthetic polymeric materials in solid form and finds particular utility in connection with the testing of thermosetting coatings of the type containing various materials such as epoxy ether resins, urethanes and polyesters, in which crosslinking of the molecules takes place during the curing of the coating. In coatings of this kind the extent of the crosslinking which takes place may be estimated by the extent of the deformation of the coating under load at an elevated temperature.

The invention has for an important object the provision of an instrument for the testing of thermosetting coatings of the kind mentioned which is portable, easily operated, and which is of simple design and rugged construction.

Another object of the invention is to provide a coating testing instrument by which a relatively small area of the coating under examination may be quickly heated under constant load conditions to produce deformation of the coating of which a characteristic of the coating such as the extent of crosslinking or curing may be determined without introducing errors due for example to continuation of the curing as a result of prolonged heating.

Another object of the invention is to provide a coating testing instrument embodying a heated head or hot tip shaped to produce indentations in a coating when pressed in a heated condition against the coating, and including means for heating the tip to a predetermined temperature and means whereby the tip may be pressed against the coating with a predetermined pressure to produce an impression therein by which the extent of curing or crosslinking of the coating will be indicated.

The above and other important objects and advantages of the invention will become evident from the following detailed description, constituting a specification of the same when considered in conjunction with the annexed drawings, wherein—

FIGURE 1 is a side view, partly in central, longitudinal cross-section, and on a somewhat reduced scale, of one preferred embodiment of the testing instrument of the invention;

FIGURE 2 is a fragmentary perspective view on an enlarged scale of a portion of the hot tip of the FIG. 1 instrument, showing details of structure of the same; and FIGURE 3 is a detail, on a greatly enlarged scale, and in cross-section, showing a portion of the impression forming end of the hot tip of the FIG. 1 instrument and the impression formed thereby in a coating which is being tested.

Referring now to the drawings in greater detail, the instrument of the illustrated embodiment of the invention includes a main body in the form of a tubular barrel 10, provided at one end with a longitudinally extending tubular handle 12, by which the instrument is held, and an external end flange 14 at the handle end of the barrel. The barrel 10 is open at the end opposite the handle 12, and is formed with an enlarged portion 16 forming an end socket, which is surrounded at the open end of the barrel by an external flange 18 providing a flat, annular, work engaging face 20.

Within the barrel a metal plunger 22 is movably disposed for longitudinal movement therein, which plunger has an enlarged tip or head portion 24 slidably disposed in the socket 16 and a reduced tubular portion 26 slidably extended inwardly of the barrel beyond the bottom of the socket and within which an electrical heater of conventional type is located. The heater, not shown, may be of any suitable type, such as that commonly employed in electrical soldering irons and may consist of a coil of suitably insulated resistance wire enclosed in the tubular portion 26 and connected to flexible conductors, indicated at 28, which extend through the handle 12 into the barrel and which may lead to any suitable source of electrical current, such as the usual household electrical system.

The current supply for the heater may be regulated by any suitable control means by which the temperature of the tip or head 24 may be accurately regulated.

A coil spring 30 is positioned in the barrel with one end bearing against the inner end of the plunger 22 and the other end seated on the interior of the handle end of the barrel to yieldingly urge the plunger toward a position with the outer end of the head 24 extending beyond the open end of the barrel.

The tip or head 24 is formed at its outer end with a number of spaced apart parallel ribs or projections 32 having free end faces 34 positioned in an arc across the free end of the head. The projections 32 may all be shaped to provide end faces 34 which are of the same width and length and the notches or grooves 36 between the projections are preferably of the same depth. The socket 16 is also of a depth to permit the head 24 to move inwardly of the socket against the pressure of the spring 30, so that initially only the centrally located ones of the projections 32 will be in contact with the coating when the face 20 is held in contact with the coating at the beginning of a test. Thus, it will be seen that the distance to which the projections 32 extend from the open end of the barrel is greatest at the center of the head and decreases progressively with the distance of the projections from the center.

By way of example, making use of the instrument constructed as described above, electrical current is supplied to the heater in the plunger under suitable control to heat the plunger to a desired predetermined temperature. The free end of the head or hot tip 24 is then pressed against a coating such as that indicated at 38 in FIGURE 3 on the flat base 40, until the face 20 of flange 18 engages the surface of the coating, so that the faces 34 of centrally located ones of the projections 32 will be urged into contact with the coating by a predetermined pressure of the spring 30. The instrument thus held in engagement with the coating under test, is allowed to remain in such contact therewith for a predetermined period of time to heat a portion of the coating and allow the projections 32 to penetrate or impress the coating, after which the instrument is removed and the number of the impressions made in the coating, such as those shown at 42 in FIGURE 3, are counted.

It will be apparent that the number of impressions made by the instrument in the coating will be an indication of the condition of hardness or degree of cure of the coating. In the case of coatings of the character hereinbefore mentioned the number of the impressions left in the coating by the instrument will be an index for example of the degree of crosslinking which has taken place during the curing of the coating.

By way of example, a typical instrument of this character, made in accordance with the invention, may have the faces 34 of the projections 32 disposed on an arc of approximately 1.55 inch radius, the ribs being about one-half inch long, about .005 inch wide and the notches or slots between the ribs being about .095 inch deep. The spring 30 of such a typical instrument will be of such character as to urge the hot tip into engagement with the coating with a force of approximately 3000 grams when the face 20 is in engagement with the surface of the coating.

It will, of course, be understood that the number of impressions made by the projections 32 may vary widely with different types of coatings and with different degrees of curing or cross-linking of the coating, and that the instrument may be calibrated by applying it at predetermined temperatures for predetermined periods of time to typical coatings of known composition in various stages of curing or hardening, whereby the degree of cure or cross-linking of a particular coating under test may be accurately determined by the number of impressions made.

It will, of course, be understood that the embodiment of the invention disclosed herein is intended to be illustrative only, and that the instrument is capable of various modifications within the spirit of the invention and the scope of the appended claims.

The invention constructed and used as described above provides an instrument of simple design and rugged construction by which the condition of cure or degree of cross-linking in coatings of various types may be quickly and easily determined.

Having thus clearly shown and described the invention, what is claimed as new and desired to secure by Letters Patent is:

1. A testing instrument suitable for measuring the degree of cure of a synthetic polymeric material comprising a head element which includes a convex end face having a plurality of spaced-apart projections thereon, a support member upon which the element is slidably mounted for movement into and out of a position with said face extended beyond one end of the member, whereby said element may be moved into engagement with a surface of said material and yieldable means positioned for coaction with said element and member to yieldingly urge said element toward said position, whereby engagement of said element with the surface of said material provides an indication of the degree of cure of said material.

2. A testing instrument suitable for measuring the degree of cure of a synthetic polymeric material comprising a head element which includes a convex end face having a plurality of spaced-apart projections thereon, a support member upon which the element is slidably mounted for movement into and out of a position with said face extended beyond one end of the member for engagement with a surface of the material to be tested, yieldable means positioned for coaction with said element and member to yieldingly urge the element toward said position, and means on said member positioned for engagement with said surface to limit the movement of said element away from said position when said element is in engagement with said surface, whereby engagement of said element with the surface of said material provides an indication of the degree of cure of said material.

3. A testing instrument suitable for measuring the degree of cure of a synthetic polymeric material comprising a head element which includes a convex end face having a plurality of spaced-apart projections thereon, a support member upon which the element is slidably mounted for movement into and out of a position with said face extended beyond one end of the member for engagement with a surface of the material to be tested, yieldable means positioned for coaction with said element and member to yieldingly urge said element toward said position and electrical means for heating said element, whereby engagement of said element with the surface of said material provides an indication of the degree of cure of said material.

4. A testing instrument suitable for measuring the degree of cure of a synthetic polymeric material comprising a head element which includes a convex end face having a plurality of spaced-apart projections thereon, a support member upon which the element is slidably mounted for movement into and out of a position with said face extended beyond one end of the member for engagement with a surface of the material to be tested, yieldable means positioned for coaction with said element and member to yieldingly urge the element toward said position, means on said member positioned for engagement with said surface to limit the movement of said element away from said position when said element is in engagement with said surface, and electrical means for heating said element, whereby engagement of said element with the surface of said material provides an indication of the degree of cure of said material.

5. A testing instrument suitable for measuring the degree of cure of a synthetic polymeric material comprising a head element which includes a convex end face having a plurality of identically-shaped, spaced-apart parallel projections thereon, an elongated, hollow support member in which the element is slidably disposed for movement into and out of a position with said face extended beyond one end of the member, yieldable means in the member positioned for coaction with the element and member to yieldingly urge the element toward said position, and means on said one end of said member positioned for engagement with a surface of the material to be tested to limit movement of the element away from said position when said element is in engagement with said surface, whereby engagement of said element with the surface of said material provides an indication of the degree of cure of said material.

6. A testing instrument suitable for measuring the degree of cure of a synthetic polymeric material comprising a head element which includes a convex end face having a plurality of identically-shaped, spaced-apart parallel projections thereon, an elongated, hollow support member in which the element is slidably disposed for movement into and out of a position with said face extended beyond one end of the member, yieldable means in the member positioned for coaction with the element and member to yieldingly urge the element toward said position, means on said one end of said member positioned for engagement with a surface of the material to be tested to limit movement of the element away from said position when said element is in engagement with said surface, and electrical means for heating said element, whereby engagement of said element with the surface of said material provides an indication of the degree of cure of said material.

7. A testing instrument suitable for measuring the degree of cure of a synthetic polymeric material comprising a head element which includes a convex end face having a plurality of identically-shaped, spaced-apart parallel projections thereon, an elongated tubular support member having a handle at one end and within which said element is slidably disposed for movement into and out of a position with said face extended beyond the other end of the member, a coil spring in the member positioned for coaction with the element and member to yieldingly urge the element toward said position, said member having an external flange at said other end positioned for engagement with a surface of the material to be tested to limit the force exerted by the spring tending to urge the element toward the surface when said element is in engagement with said surface, whereby engagement of said element with the surface of said material provides an indication of the degree of cure of said material.

8. A testing instrument suitable for measuring the degree of cure of a synthetic polymeric material comprising a head element which includes a convex end face having a plurality of identically-shaped, spaced-apart, parallel projections thereon, an elongated tubular support member having a handle at one end and within which said element is slidably disposed for movement into and out of a position with said face extended beyond the other end of the member, a coil spring in the member positioned for coaction with the element and member to yieldingly urge the element toward said position, said member having an external flange at said other end positioned for engagement with a surface of the material to be tested to limit the force exerted by the spring tending to urge the element toward the surface when said element is in engagement with said surface, and electrical means for heating said element, whereby engagement of said element with the surface of said material provides an indication of the degree of cure of said material.

9. A method for measuring the degree of curing of a solid synthetic polymeric material comprising:

positioning adjacent the surface of the material to be tested an instrument having a convex end face, said end face having thereon a series of parallel, spaced-apart projections of equal depth;

heating said projections to a temperature sufficient to give an indication of the degree of cure of said material;

applying said instrument to said surface with a pressure sufficient, at the temperature of said projections, to give an indication of said degree of cure to thereby urge said projections to form impressions in the surface of said material;

removing said instrument from said surface; and, counting the number of impressions formed in said surface to thereby determine the degree of curing of said material.

References Cited by the Examiner
UNITED STATES PATENTS

| | | | |
|---|---|---|---|
| 989,471 | 4/1911 | Abraham | 73—150 X |
| 1,519,602 | 12/1924 | Zimmerman et al. | 73—81 |
| 2,713,259 | 7/1955 | Grodzinski et al. | 73—81 |
| 2,759,353 | 8/1956 | Roberts | 73—150 X |

LOUIS R. PRINCE, *Primary Examiner.*

M. B. HEPPS, *Assistant Examiner.*